United States Patent

Gumacos

[15] 3,649,821

[45] Mar. 14, 1972

[54] DIGITAL MULTIPLE-TONE GENERATOR

[72] Inventor: Constantine Gumacos, Broomall, Pa.

[73] Assignee: Philco-Ford Corporation, Philadelphia, Pa.

[22] Filed: June 15, 1970

[21] Appl. No.: 46,221

[52] U.S. Cl. ................................235/152, 235/197, 328/14

[51] Int. Cl. ....................................................G06f 15/34

[58] Field of Search ...............235/152, 197, 150.53; 328/14, 328/187

[56] References Cited

UNITED STATES PATENTS

| | | | |
|---|---|---|---|
| 3,512,092 | 5/1970 | Thurnell | 328/14 |
| 3,529,138 | 9/1970 | Andre et al. | 235/197 X |

OTHER PUBLICATIONS

E. T. Powner, Digital Waveform Synthesis, " Electronic Engineering" Aug. 1969, pp. 50–54.

R. Reiner, Digital Controlled Function Synthesizer, " Instruments and Control Systems" Aug. 1970, pp. 103–105.

*Primary Examiner*—Malcolm A. Morrison

*Assistant Examiner*—David H. Malzahn

*Attorney*—Herbert Epstein

[57] ABSTRACT

A digital oscillator circuit which generates binary words representative of quantized samples of a sinusoid of desired frequency. The circuit comprises two shift registers, a multiplier, and an adder, interconnected so that the contents of the first shift register are multiplied by a given stored number, the contents of the second shift register are subtracted from the product, and the resultant difference is transferred into the first shift register after its contents are transferred into the second shift register. The desired frequency is obtained by proper choice of the given stored number, the initial constants stored in the two shift registers, and the rate at which the contents of the first shift register are completely transferred into the second shift register and the multiplier and adder are actuated.

Binary words representative of a frequency-modulated carrier are obtained by using a modulating voltage, rather than a constant, in place of the given stored number.

Four digital oscillator circuits are interconnected to form a digital multiple-tone generator which can provide binary words representative of time-multiplexed quantized samples of a large number of tones. Frequencies of desired tones are controlled by appropriate choice of multiplier and shift register constants.

8 Claims, 5 Drawing Figures

INVENTOR.
CONSTANTINE GUMACOS

DIGITAL MULTIPLE-TONE GENERATOR

BACKGROUND OF THE INVENTION

In many communication systems, information is transmitted by means of a number of continuous-wave tones or subcarriers, each modulated separately with the information which it is to carry. In digital communications systems, discrete, uniformly spaced, quantized samples of the continuous waveform of each tone, or binary words representative of such samples, are used.

Such quantized samples can be produced, for example, by an array of oscillators or an oscillator and frequency countdown technique. Such binary words can be produced for example by a computer technique known as "table lookup."

In the array-of-oscillators technique the required tones are generated by analog means using either a separate oscillator for each tone or a smaller number of oscillators the outputs of which are combined in mixing circuitry to generate the required tones. The tones are then sampled periodically and processed in analog-to-digital (A/D) converters to convert the analog samples into binary words. This technique has the disadvantage of requiring much expensive, complex equipment because of its use of multiple analog oscillators, mixers and A/D converters.

The countdown technique requires a master oscillator from which the required tones are derived by frequency division accomplished by counting down the master oscillator output to lower frequencies with binary counters. For example, a binary counter comprising three binary stages in tandem, will produce one change in output stage for every eight changes in input stage. Thus if such a counter is connected to the master oscillator, the frequency of output pulses generated by the counter will be an eighth of the frequency of the master oscillator. The tones thus generated are periodically sampled and processed in A/D converters to convert the analog samples to binary numbers. This technique also requires much expensive, complex equipment because of the need for binary counters and A/D converters.

The "table lookup" technique is directly applicable to a digital system. In it, the value of every quantized sample of each sinusoid corresponding to each needed tone is calculated in advance and stored as a binary word in permanent storage. However, this method suffers from the disadvantage of requiring a large amount of storage and complex retrieval logic for systems employing a large number of tones or a large number of samples per tone.

Accordingly important objects of my invention are:

To provide a digital oscillator of comparatively simple structure which can directly generate binary words representative of quantized samples of a desired tone, without resort to the complexities of analog tone generation, sampling and A/D conversion;

To provide a digital oscillator circuit which can directly provide binary words representative of quantized samples of a frequency-modulated tone;

To provide a digital multiple tone generator which can directly provide binary words representative of time-multiplexed quantized samples of a large number of tones, while requiring only a small amount of initial storage.

DRAWINGS

SYSTEM DESCRIPTION AND OPERATION

Figure 1:
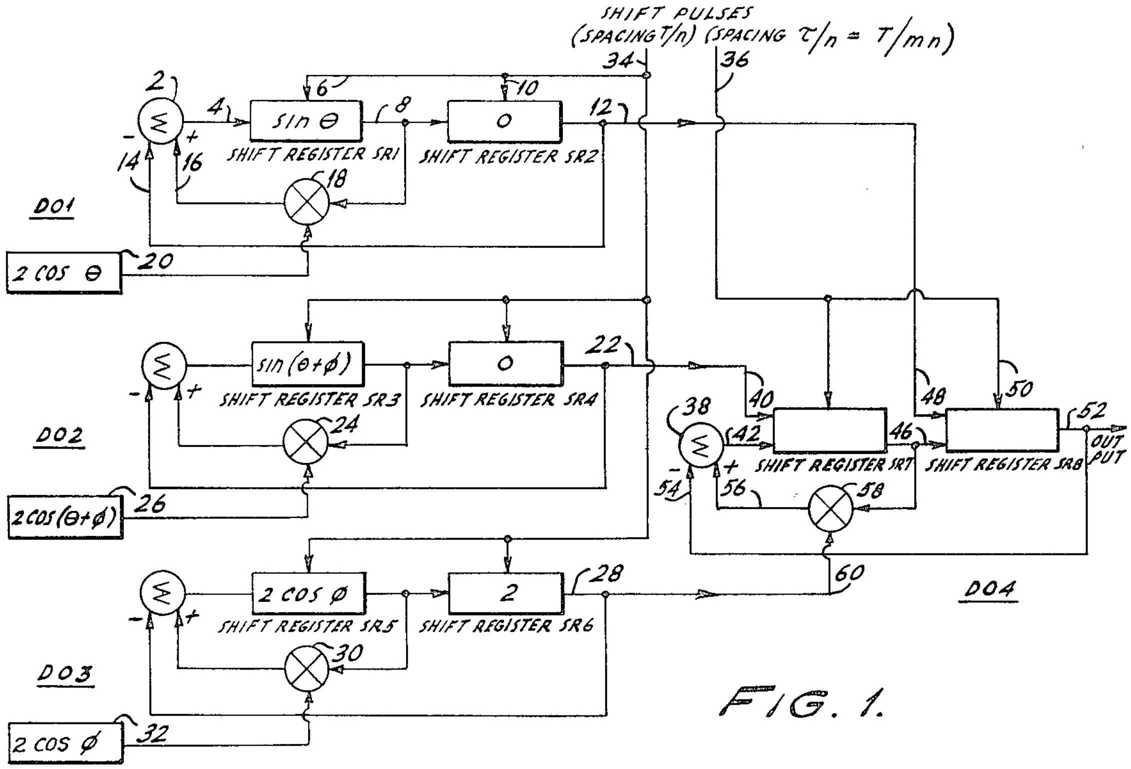
FIG. 1 is a block diagram of a digital multiple-tone generator according to the invention.

The preferred embodiment, shown in FIG. 1, of a digital multiple-tone generator according to the invention comprises four digital oscillator circuits, D01 to D04, interconnected as shown in FIG. 1. Each digital oscillator circuit generates a series of binary words. Each word is time-spaced from the next word by an interval of T seconds and is representative of the instantaneous magnitude of a given sinusoid at the beginning of a particular T second interval. The series of binary words so generated over a plurality of T second intervals is representative of a corresponding series of quantized samples of a complete cycle of the sinusoid. The precision with which each quantized sample represents the sinusoid is directly dependent on the length of each binary word. For generality of description, it will be assumed in the ensuing discussion that each binary word comprises $n$ binary digits (or bits), where $n$ is a positive integer greater than zero.

Digital oscillator circuit DO1 comprises a pair of $n$-stage binary shift registers SR1 and SR2, an $n$-stage digital multiplier 18, and an $n$-stage digital adder 2. Because all of those structures may be of conventional form, they are represented herein by blocks. The shift registers SR1 and SR2 are supplied with shift pulses via lead 34 (source not shown) at a rate of one pulse per $T/n$ seconds, so that the contents at any given instant of each register are completely shifted and read out at T second intervals. (Alternatively, if parallel rather than serial read out devices are used, so that the contents of each of the $n$ stages of a register can be simultaneously transferred to another register, then shift pulses need be supplied at only a T second rate.) The output 8 of shift register SR1 is connected to the input of shift register SR2 and to the input of multiplier 18. An $n$-bit storage register 20 also is connected to multiplier 18, wherein once every T seconds the contents of shift register SR1 are multiplied by the contents of storage register 20. The contents of storage register 20 are always available as an input to multiplier 18 to be used for this purpose. The source of command shift pulses necessary to activate multiplier 18 is also of conventional form and is therefore not shown. The outputs of multiplier 18 and shift register SR2 are connected to input terminals 16 and 14, respectively, of adder 2, wherein the contents of shift register SR2 are subtracted from the output of multiplier 18. The output of the adder 4 is then shifted into shift register SR1.

The component devices in digital oscillator circuit DO1 operate in synchronism, so that once every T seconds, the contents of shift register SR1 are multiplied by the contents of storage register 20, the contents of shift register SR2 are subtracted from the resultant product, and the resultant difference is shifted via conductor 4 into shift register SR1. At the same time, the contents previously existing in shift register SR1 are shifted into shift register SR2. This sequence of events is repeated at T second intervals.

Prior to commencement of operation of oscillator DO1, the $n$-bit word equal to $\sin\theta$, where $\theta$ is a constant, is inserted in register SR1 as an initial value, and the initial value zero is inserted in register SR2. The binary word equal to the constant $2\cos\theta$ is stored permanently in storage register 20.

The binary words representative of these constants may be entered into the shift registers and storage register by supplying electronic signals (source not shown) representative of those binary words to the input terminals of the registers. Thereafter, the source supplying those electronic signals is removed and the contents of each register is changed only by operating the digital oscillator circuit as herein described.

Digital oscillators DO2 and DO3 are interconnected and function in a manner similar to digital oscillator DO1, except that the initial conditions and stored multipliers of DO2 and DO3 are different from those of DO1.

In digital oscillator DO2, the initial value inserted into shift register SR3 is sin $(\theta+\phi)$, where $\phi$ is a constant, the initial value inserted into shift register SR4 is zero, and the constant permanently stored in storage register 26 is 2 cos $(\theta+\phi)$.

In digital oscillator DO3, the initial value inserted into shift register SR5 is 2 cos $\phi$, the initial value inserted into shift register SR6 is two, and the constant permanently stored in storage register 32 is 2 cos $\phi$.

Digital oscillator circuits, DO1, DO2, and DO3 are all supplied via line 34 with shift pulses from the same source. Therefore shifting operations in each of the three circuits is synchronized with each of the others.

Digital oscillator circuit DO4 comprises components similar to those of DO1, DO2 and DO3; however the functions and interconnections of components in DO4 are somewhat different. More particularly, the output 12 of shift register SR2 is connected to input 48 of shift register SR8, so that at T second intervals the contents of shift register SR2 are transferred into shift register SR8. The output 22 of shift register SR4 is connected to input 40 of shift register SR7 so that the contents of shift register SR4 are transferred into shift register SR7 at the same T second intervals. The output 28 of shift register SR6 is connected to input 60 of multiplier 58 so that at T second intervals the contents of shift register SR6 are available in digital oscillator circuit DO4 as a multiplier.

The n-stage shift registers SR7 and SR8 are supplied via line 36 with shift pulses at a $\tau/n$ second rate so that the contents of each register are completely shifted and readout at $\tau$ second intervals. $\tau$ is an interval smaller than T, so that during each T second interval between shifts of new data from digital oscillator circuits DO1, DO2, and DO3 into digital oscillator circuit DO4, a plurality of shifts takes place within digital oscillator circuit DO4. After each transfer of data from shift register SR2 into shift register SR8 and shift register SR4 into shift register SR7, the contents of shift register SR7 are multiplied in multiplier 58 by the contents of shift register SR6, the contents of shift register SR8 are subtracted in adder 38 from the product, and the result is shifted via input 42 into shift register SR7. At the same time the contents previously existing in shift register SR7 are shifted into shift register SR8, where they are available at the output 52 of the digital multiple-tone generator.

THEORY OF OPERATION

The mathematical equivalent of multiplying in multiplier 18 the contents of shift register SR1 by the contents of storage register 20, and subtracting from the product the contents of shift register SR2 is (2 cos $\theta$ sin $\theta$—0). From the trigonometric identity $$2\cos\alpha \sin ⅞ = \sin(\alpha+\beta) - \sin(\alpha-\beta) \quad (1)$$

it is clear that $$2\cos\theta \sin\theta - 0 = \sin 2\theta. \quad (2 \sin ⅞$$

Equation (2) demonstrates that at the conclusion of the first T second interval, i.e., at time $t=T$, a binary word representative of sin $2\theta$ is entered into shift register SR1 and a binary word representative of sin $\theta$ is transferred from shift register SR1 into shift register SR2.

During the second $T$ second interval digital oscillator circuit DO1 functions exactly as it did during the first $T$ second interval except that it operates on the new binary words which have been entered into shift registers SR1 and SR2 at the conclusion of the first $T$ second interval. Thus during the second $T$ interval the operations performed by digital oscillator circuit DO1 are mathematically equivalent to 2 cos $\theta$ sin $2\theta$—sin $\theta$. Using equation (1) it can be shown that $$2\cos\theta \sin 2\theta - \sin\theta = \sin 3\theta \quad (3)$$

Equation (3) demonstrates that at $t=2T$, a binary word representative of sin $3\theta$ is entered into shift register SR1 and a binary word representative of sin $2\theta$ is transferred from shift register SR1 into shift register SR2.

In this manner, it can be shown that if the contents of shift register SR1 are a binary word representative of sin $(K+1)\theta$, where K is any integer, and the contents of shift register SR2 are a binary word representative of sin $K\theta$, the digital oscillator circuit will perform the mathematical operation:

$$2\cos\theta \sin(K+1)\theta - \sin K\theta = \sin(K+2)\theta. \quad (4)$$

Equation (4) demonstrates that, at $t=(K+1)T$, a binary word representative of sin $(K+2)\theta$ is entered into shift register SR1 and a binary word representative of sin $(K+1)\theta$ is transferred from shift register SR1 into shift register SR2. Thus the output signal at output 12 produced by reading out the contents of shift register SR2 at T second intervals, consists of a succession of binary words whose respective values can be represented as a function of time by:

$$f(t=KT) = \sin K\theta, \quad (5)$$

where $K=0, 1, 2, 3, \ldots$

Figure 2:
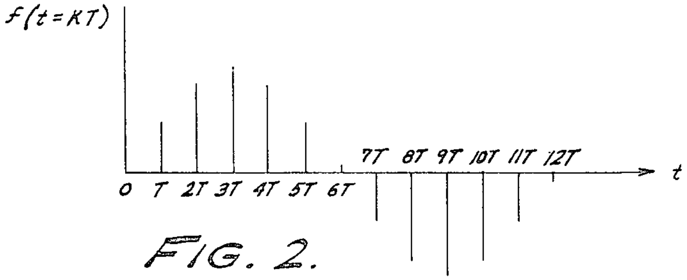
FIG. 2 depicts quantized samples of a sine wave corresponding to respective binary words generated by a digital oscillator circuit embodied in the digital multiple-tone generator of FIG. 1.

The discrete values represented by Equation (5) are plotted in FIG. 2 for $\theta=30°$, a given T, and successive integer values of K. This result demonstrates that operation of digital oscillator circuit DO1, produces in accordance with the invention binary words representative of discrete quantized samples of a sine wave, at uniformly spaced time intervals.

From Equation (5), it can be seen that, when $K\theta=2\pi$ radians, a succession of binary words respectively representative of successive values of a complete cycle of the sinusoid will have been generated. Thus $2\pi/\theta$ of the $T$ second intervals are required to produce that succession of binary words. Therefore the period of the sinusoid whose successive values are represented by the words is $(2\pi)/\theta\ T$, and its frequency is $$f=\theta/2\pi T \quad (6)$$

Figure 3:
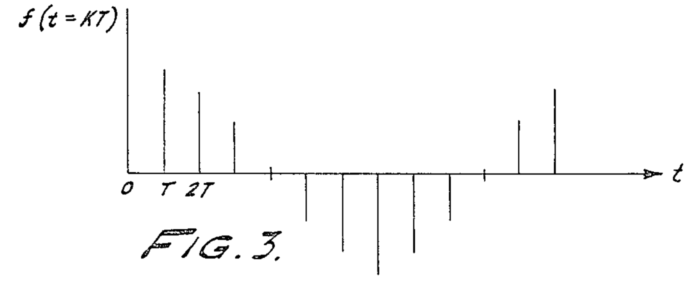
FIG. 3 depicts quantized samples of a sine wave, corresponding to respective binary words generated by a digital oscillator circuit having initial conditions different than those of the digital oscillator circuit generating binary words representative of the sine wave samples shown in FIG. 2.

From Equation (6) it can be seen that by proper choice of constants $T$ and $\theta$, a succession of words representative of a sinusoid of any desired frequency can be generated. Moreover, since Equation (4) is a general result, a succession of binary words respectively representative of a corresponding succession of discrete values of a sinusoid of arbitrary phase can be generated by proper choice of the initial conditions in the shift registers. For example, if $\theta$ equals 30° and the initial condition in shift register SR1 is sin $3\theta$, and that in shift register SR2 is sin $2\theta$, successive binary words respectively representative of those successive discrete values, shown in FIG. 3, of a sinusoid will be generated. If the initial conditions are cos $\theta$ in shift register SR1 and unity in shift register SR2, successive binary words respectively representative of successive discrete values of a cosine wave will be generated.

Digital oscillator circuits DO2 and DO3 operate in a similar manner, except that the initial conditions and multiplying constants are chosen to provide at output 22 of digital oscillator circuit DO2 a series of binary words representative of:

$$f(t=KT) = \sin K(\theta+\phi), \quad (7)$$

and at output 28 of digital oscillator circuit DO3 a series of binary words representative of:

$$f(t=KT) = 2\cos K\phi. \quad (8)$$

The three sets of binary words, respectively representative of successive discrete values of three sinusoids and respectively produced by these three digital oscillators, DO1, DO2, and DO3, are then transferred, as shown in FIG. 1, to digital oscillator circuit DO4 for generation of a plurality of time multiplexed tones. After the $K$th shift of the shift registers in DO1, DO2, and DO3, shift register SR7 of DO4 contains a binary word representative of sin $K(\theta+\phi)$, shift register SR8 contains a binary word representative of sin $K\theta$, and shift register SR6 contains a binary word representative of 2 cos $K\phi$. The quantity produced by multiplying the contents of shift register SR7 by the contents of shift register SR6, and subtracting from the resultant product the contents of shift register SR8 is $$2\cos K\phi \sin K(\theta+\phi) - \sin K\theta.$$

Using Equation (1) it can be shown that $$2\cos K\phi \sin K(\theta+\phi) - \sin K\theta = \sin K(\theta+2\phi). \quad (9)$$

Equation (9) demonstrates that at a time $(t=KT+\tau)$, a binary word representative of sin $K(\theta+2\phi)$ is entered into shift register SR7 and a binary word representative of sin $K(\theta+\phi)$ is transferred from shift register SR7 into shift register SR8. $\tau$ is chosen to be $T/m$, where $m$ is the number of tones required to be generated. Thus the circuitry of digital oscillator circuit DO4 performs $m$ mathematical operations and complete transfers of data during each $T$ second interval elapsing between the input of new data from the other digital oscillator circuits.

During the next $\tau$ second interval the operations performed by digital oscillator circuit DO4 are equivalent to $2\cos K\phi \sin K[\theta+2\phi]-\sin K[\theta+\phi]$. *Using Equation* (1) it can be shown that $$2\cos K\phi \sin K[\theta+2\phi]-\sin K[\theta+\phi]=\sin K[\theta+3\phi]. \quad (10)$$

In general, if the contents of shift register SR7 are a binary word representative of $\sin K[\theta+(j+1)\phi]$, where $j$ is an integer, and the contents of shift register SR8 are a binary word representative of $\sin K[\theta+(j)\phi]$, digital oscillator circuit DO4 will generate an output 52, which can be represented as a function of time by:

$$f(t=KT+j\tau)=\sin K[\theta+j\phi] \quad (11)$$

where $K=0, 1, 2...$ $j=0, 1, 2...m-1$ $m$ = the number of tones required and $\tau=T/m$.

Figure 4:
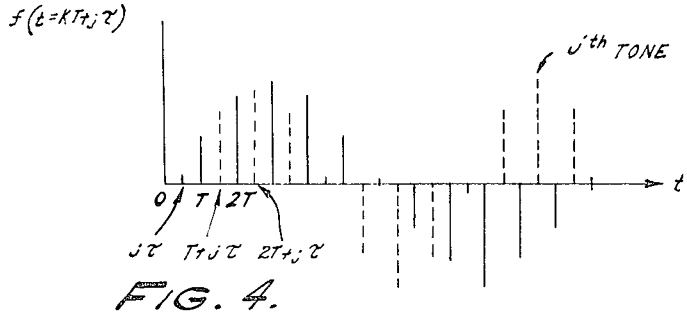
FIG. 4 depicts quantized samples of two tones, corresponding to the binary words generated by the digital multiple-tone generator of FIG. 1.

Equation (11) shows that binary words representative of sampled values of $m$ tones will appear in a single time-multiplexed output with the $j^{th}$ tone appearing at the $j^{th}$ time slot, as shown in FIG. 4.

From Equation (11) it can be seen that $2\pi/\theta+j\phi$ intervals are required to produce a complete cycle of a sinusoid. The period then, is $(2\pi/\theta+j\phi)\ T$, and the frequency of the sinusoid is:

$$f=\theta/2\pi T+j\phi/2\pi T. \quad (12)$$

Equations (11) and (12) demonstrate that at each of the times $t=KT$, oscillator DO4 will produce a binary word representative of a discrete quantized sample of a sinusoid of frequency $\theta/2\pi T$, that at each of the times $t=KT+\tau$ *oscillator DO4 will produce discrete quantized samples of a sinusoid of frequency* $\theta/2\pi T+\phi/2\pi T$ and that at each of the times $t=KT+j\tau$, oscillator DO4 will produce a binary word representative of a discrete quantized sample of a sinusoid of frequency $\theta/2\pi T+j\phi/2\pi T$. Thus by properly choosing the initial constants, $\sin\theta$, $\sin(\theta+\phi)$, and $2\cos\phi$, loaded into the shift registers, the desired tones will be generated. Moreover, although a large number of tones can be generated, initial storage of only nine binary numbers (in the six shift registers and three storage registers) is required.

The accuracy of the frequency of the generated tones will be dependent on the accuracy with which the system performs the described mathematical operations. Since only a finite number of stages can be used in each shift register, there will, of necessity, be some roundoff error in performing the mathematical operations. In order to reduce the accumulation of such roundoff errors, it will be beneficial periodically to reset the various shift registers to their initial values, e.g., to reset them every NT seconds, where NT is the least common multiplier among all the tone periods.

OPERATION OF THE DIGITAL OSCILLATOR CIRCUIT AS AN FM MODULATOR

Figure 5:
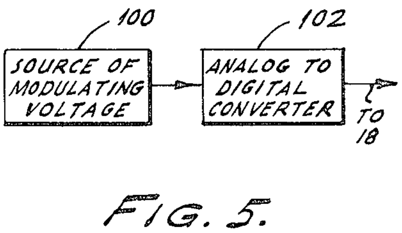
FIG. 5 shows structure employed in a second embodiment of the invention.

In the foregoing description of the digital multiple-tone generator shown in FIG. 1, multipliers having constant values were stored in registers 20, 26 and 32 and used in the basic digital oscillator circuits DO1, DO2, and DO3. Each of those circuits generated successive binary words respectively representative of a discrete value of a single tone whose frequency depended on the value of initial conditions chosen. For example, digital oscillator circuit DO1 (see FIG. 1) used a multiplier of constant value $2\cos\theta$ stored in register 20, and binary words representative of discrete values of a single tone having frequency proportional to $\theta$ (see Equation (6)) was generated. From Equation (6) however it can be seen that a change in $\theta$ will result in a change in frequency of the generated tone. This property is utilized in a second embodiment of the invention to provide binary words representative of quantized samples of a frequency-modulated tone. This second embodiment of the invention is similar to the basic digital oscillator circuit DO1, shown in FIG. 1, except that storage register 20 is replaced by tandem combination of a source 100 of modulating voltage and an A/D converter 102 (see FIG. 5). Thus a binary word representative of the modulating voltage is supplied by A/D converter 102 to multiplier network 18, and the output 12 of digital oscillator circuit DO1 is a succession of binary words representative of successive discrete values of a carrier which is frequency modulated by the modulating voltage.

As an illustration of the theory of operation of this embodiment of the invention, the results obtained by use of the initial conditions previously specified for digital oscillator circuit DO1 are compared with those obtained when register 20 is replaced by source 100 and converter 102. As described hereinbefore, when the register 20 supplies a constant binary word equal to $2\cos\theta$, the digital oscillator circuit DO1 will produce a succession of binary words respectively representative of a succession of quantized samples of a sinusoid, $$f(t=KT)=\sin K\theta, \quad (5)$$

of frequency $$f=\theta/2\pi t \quad (6)$$

At time, $t=KT$, the binary word in shift register SR1 is sin $(K+1)$, and the binary word in shift register SR2 is $\sin K\theta$.

Now let the heretofore-constant binary word equal to $2\cos\theta$ be changed to a different value $2\cos\theta'$, e.g., by substitution of source 100 and converter 102 for register 20. The constant which the binary word in shift register SR1 represents is $\sin(K+1)\theta$. This constant can alternatively be represented by $(a\sin(\theta'+\phi))$. The constant which the binary word in shift register SR2 represents is $\sin K\theta$. This constant can alternatively be represented by $(a\sin\phi)$. The first mathematical operation performed by digital oscillator circuit DO1 after the modulating signal is changed to $2\cos\theta'$ is $$(2\cos\theta')\ (a\sin(\theta'+\phi))-a\sin\phi. \quad (13)$$

From the trigonometric identities:

$$\left.\begin{aligned}\sin(\alpha+\beta)&=\sin\alpha\cos\beta+\cos\alpha\sin\beta\\ \cos(\alpha+\beta)&=\cos\alpha\cos\beta-\sin\alpha\sin\beta\\ \sin 2\gamma&=2\sin\gamma\cos\gamma\\ \text{and}\quad \cos 2\gamma&=\cos^2\gamma-\sin^2\gamma\end{aligned}\right\} \quad (14)$$

it can be shown that $2a\cos\theta'\sin(\theta'+\phi)-a\sin\phi=a\sin 2(\theta+\phi)$, and that in general, $$2a\cos\theta'\sin(K+1)(\theta'+\phi)-a\sin K(\theta'+\phi)=a\sin(K+2)(\theta'+\phi). \quad (15)$$

This result is similar in form to Equation (4). By comparing the terms of Equations (15) and (4) it can be seen that changing the magnitude of the modulating voltage changes the frequency of the sinusoid whose successive discrete values are represented by the succession of words produced by oscillator DO1. In particular, if a modulating voltage equal to $2\cos\theta$ is applied and its variations about zero voltage are restricted to that narrow range about $\theta=90$ degrees for which $\cos\theta$ is approximately equal to $\theta$, i.e., $\theta$ between about 80° and 100°, the frequency of that sinusoid (see Equation (6)) will vary linearly with the modulating voltage.

I claim:

1. A digital oscillator circuit comprising:

a. first and second $n$-stage binary shift registers, means for entering a first constant into said first shift register, means for entering a second constant into said second shift register, b. means for supplying an $n$-bit binary number, c. means for multiplying the contents of said first shift register by said binary number to produce a product, d. means for subtracting the contents of said second shift register from said product, to produce a difference, e. means for transferring said difference into said first shift register at selectable regular intervals, f. means for transferring the contents of said first shift register, existing prior to said transfer of said difference, into said second shift register at said selectable regular intervals, and g. means for providing the contents of said second shift register as an output of said digital oscillator circuit.

2. The circuit of claim 1 wherein said first constant is directly proportional to sin $(K+1)\theta$ and said second constant is directly proportional to sin $K\theta$, wherein $K$ is any integer 0, 1, 2 . . . and $\theta$ is a constant.

3. The circuit of claim 1 wherein said binary number is a constant.

4. The circuit of claim 2 wherein said binary number is a constant directly proportional to 2 cos $\theta$.

5. The circuit of claim 1 wherein said means for supplying said $n$-bit number comprises a source of a modulating signal.

6. The circuit of claim 5 wherein said modulating signal has a magnitude varying directly as cos $\theta$, where $\theta$ lies between about 80° and about 100°.

7. A digital multiple-tone generator system comprising:

a. first, second and third digital oscillator circuits each comprising: first and second $n$-stage binary shift registers, means for entering a constant into said first shift register, means for entering a second constant into said second shift register, means for supplying an $n$-bit binary number, means for multiplying the contents of said first shift register by said binary number to obtain a product, means for subtracting the contents of said second shift register from said product to obtain a difference, means for transferring said difference into said first shift register at selectable regular intervals, means for transferring into said second shift register the contents of said first shift register existing prior to the transfer of said difference into said first shift register, means for providing the contents of said second shift register as an output of said digital oscillator circuit, b. means for applying a periodic shift signal substantially simultaneously to said first and second shift registers of all of said first, second and third digital oscillator circuits, said first and second shift registers of said first, second and third digital oscillator circuits being responsive to said shift signal to shift their respective contents in synchronism, and c. a fourth digital oscillator circuit comprising: first and second $n$-stage binary shift registers, means for entering into said first shift register the output of said second digital oscillator circuit, means for entering into said second shift register the output of said first digital oscillator circuit, means for multiplying the contents of said first shift register by the output of said third digital oscillator circuit to obtain a product, means for subtracting the contents of said second shift register from said product to obtain a difference, means for transferring said difference into said first shift register at a plurality of selectable regular intervals between each change in output from said first, second, and third digital oscillator circuits, means for transferring into said second shift register the contents of said first shift register existing prior to the transfer of said difference into said first shift register, and means for providing the contents of said first register as an output of said digital multiple-tone generator.

8. The system of claim 7 wherein:

a. in said first digital oscillator circuit: said first constant is directly proportional to sin$(K+1)\theta$, where $K$ is any integer 0, 1, 2 . . . and $\theta$ is a fixed value, said second constant is directly proportional to sin $K\theta$, said binary number is a fixed value directly proportional to 2 cos $\theta$, b. in said second digital oscillator circuit: said first constant is directly proportional to sin $(K+1)(\theta+\phi)$, where $\phi$ is a fixed value, said second constant is directly proportional to sin $K(\theta+\phi)$, said binary number is a fixed value directly proportional to 2 cos $(\theta+\phi)$, c. in said third digital oscillator circuit: said first constant is directly proportional to 2 cos $(K+1)\phi$, said second constant is directly proportional to 2 cos $K\phi$, *said binary number is a fixed value directly proportional to* 2 cos $\phi$.

* * * * *

PO-1050
(5/69)

UNITED STATES PATENT OFFICE
CERTIFICATE OF CORRECTION

Patent No. 3,649,821 Dated March 14, 1972

Inventor(s) Constantine Gumacos

It is certified that error appears in the above-identified patent and that said Letters Patent are hereby corrected as shown below:

Column 3, line 53 (sixth line in the first paragraph under the heading "THEORY OF OPERATION"): in equation (1), delete "7/8" and substitute --$\beta$--, so that equation (1) reads --$2 \cos \alpha \sin \beta = \sin (\alpha + \beta) - \sin (\alpha - \beta)$--.

Column 3, line 55 (eighth line in the first paragraph under the heading "THEORY OF OPERATION"): delete "(2 sin 7/8" and substitute --(2)--.

Column 6, line 28 (last line in first full paragraph in the column): change "(K+1)" to --(K+1)$\theta$--.

Signed and sealed this 25th day of July 1972.

(SEAL)
Attest:

EDWARD M.FLETCHER,JR.
Attesting Officer

ROBERT GOTTSCHALK
Commissioner of Patents